United States Patent Office 3,466,273
Patented Sept. 9, 1969

3,466,273
PROCESS FOR PRODUCING NUCLEOTIDE BY A SELECTIVE PHOSPHORYLATION
Tuneo Sowa, Kenji Sato, Shunji Ouchi, Takeyoshi Ohsawa, and Saburo Senoo, Nobeoka-shi, Miyazaki-ken, Japan, assignors to Asahi Kasei Kogyo Kabushiki Kaisha, Osaka, Japan
No Drawing. Filed Dec. 14, 1967, Ser. No. 690,425
Claims priority, application Japan, Dec. 16, 1966, 41/82,058; Jan. 7, 1967, 42/1,302
Int. Cl. C07d 51/50
U.S. Cl. 260—211.5                    5 Claims

ABSTRACT OF THE DISCLOSURE

Process for producing nucleotides by a selective phosphorylation which comprises reacting unprotected nucleosides with phosphorus oxyhalides and/or pyrophosphoryl chloride in a polar organic solvent containing organic amine-inorganic acid salts and contacting the resulting reaction mixture with water.

BACKGROUND OF THE INVENTION

Field of the invention

This invention relates to a process for phosphorylating only a primary hydroxyl group of a nucleoside selectively and preferentially without protecting the secondary hydroxyl group with a protecting group, and the object is to provide an economical process for producing nucleotides useful as chemical reagents and condiments on a commercial scale.

There have been made heretofore some attempts to phosphorylate unprotected nucleosides, for example, by J. M. Gulland and G. Ivan Hobday (J. Chem. Soc., 1940, 746), G. R. Baker and G. E. Foll (J. Chem. Soc., 1957, 3798) and G. M. Tenner [J. Am. Chem. Soc., 83, 159 (1961)].

However, any of these processes proposed heretofore are far from practical use for either in laboratory or for a commercial application because both conversion and selectivity in these reactions are quite low.

It is well known that in order to phosphorylate a particular hydroxyl group of a nucleoside, the other hydroxyl group is required to be protected by a suitable protecting reagent.

No lengthy explanation is needed to describe how useful and significant it is, if a predetermined unprotected group of nucleoside is directly and selectively phosphorylated without protecting another hydroxyl group thereof.

SUMMARY OF THE INVENTION

We have conducted a thorough study of the process for the phosphorylation of an unprotected nucleoside, and as a result, we have found a process for phosphorylating a primary hydroxyl group of an unprotected nucleoside directly and selectively.

The process of this invention comprises subjecting an unprotected nucleoside to a reaction by adding the same to a solution prepared by dissolving a phosphorus oxyhalide and/or pyrophosphoryl chloride and organic amine-inorganic acid salts in an organic solvent.

More practically, to an organic solvent maintained at a suitable temperature are added phosphorus oxyhalide and/or pyrophosphoryl chloride and organic amine-inorganic acid salts with agitation, then, to the resulting mixed solution is added an unprotected nucleoside and agitated for a suitable period of time. By mixing the resulting reaction mixture with water, the residual phosphorus oxyhalide and/or pyrophosphoryl chloride and the resulting nucleoside phosphorodihalogedate are hydrolyzed. The resulting aqueous solution is treated according to conventional process for purifying nucleotides known heretofore to yield the desired nucleoside of which a primary hydroxyl group is phosphorylated. For example, when ribonucleoside is used as a starting material, there is obtained 5'-ribonucleotide as a product.

The effect of an organic solvent greatly depends upon the type of the solvent used. In general, nitrile compounds such as acetonitrile and propionitrile, nitro-compounds such as nitromethane and nitroethane, cyclic ethers such as tetrahydrofuran and dioxane, and halogenated hydrocarbons such as dichloromethane and chloroethane are particularly effective. There may also be used sulfoxides such as dimethylsulfoxide, formamides such as dimethylformamide, and ketones such as acetone and methylethylketone with reasonably good results.

Generally speaking, however, polar solvents are effective and nonpolar solvents are not so effective. Even among polar solvents, there are unpreferable ones such as carboxylic acids, amines and alcohols which lead to side reactions and large formation of by-products.

These solvents exemplified above may be used either alone or in admixture with other kinds.

The amount of solvent used is more than 0.5 liter per mol of starting nucleoside, and preferably more than 1 liter on the same basis. The use of an excess amount is undesirable from an economical standpoint. Thus, normally, more than a mol, preferably 1.5–5.0 mols, of a phosphorus oxyhalide and/or pyrophosphoryl chloride, and more than 0.5 mol, preferably more than a mol, per mol of a phosphorus oxyhalide and/or pyrophosphoryl chloride of organic amine-inorganic acid salts are added to about a liter of the solvent.

The use of lesser amounts of organic amine-inorganic acid salts leads to a decrease in the rate of the phosphorylation reaction of a nucleoside and to an increase in the formation of by-products, thus, it is undesirable.

Since most organic amine-inorganic acid salts are hygroscopic, it is advisable from the operational standpoint to add amines and inorganic acids to the organic solvent used in the reaction to form the required salts therein rather than using the salts obtained in the conventional process.

As amines used in the process of this invention, any primary, secondary and tertiary amines are effective, while, the inorganic acids are mineral acids such as hydrogen chloride, nitric acid, sulfuric acid and chloric acid.

In practising the process of this invention, a phosphorus oxyhalide and/or pyrophosphoryl chloride and amine-mineral acid salts are added to an organic solvent and, while the resulting mixture is maintained at a temperature of −30° C. to 30° C., preferably −10° C. to 15° C., there is added an unprotected nucleoside with agitation and the reaction is carried out for a period of 0.5–10 hours.

Since the reaction period varies depending upon the types and amounts of phosphorus oxyhalide and/or pyrophosphoryl chloride and amine-mineral acid salt used, the reaction period should be suitably decided by taking these factors into account.

After the completion of reaction, excessive or unreacted phosphorus oxyhalide and/or pyrophosphoryl chloride and the resulting nucleoside phosphorodihalogedate are hydrolized by mixing the resulting reaction mixture with water.

The resulting aqueous solution may be treated according to the conventional process for separating and purifying a nucleotide and there is obtained nucleoside of which a primary alcohol group is phosphorylated, i.e. nucleotide.

The feature of this invention resides in that when phosphorylating an unprotected nucleoside using phosphorus oxyhalide and/or pyrophosphoryl chloride, the selectivity of phosphorylation of a primary hydroxyl group of a nucleoside can be extremely enhanced by using a polar organic solvent containing an organic amine-inorganic acid salt.

The conversion and selectivity of reaction in the process of this invention are sensitively affected by the quantitative relations among the reagents used. Thus, in practicing the process of this invention, the quantitative relations must be strictly observed in order to obtain an optimum result.

DESCRIPTION OF PREFERRED EMBODIMENTS

This invention will be explained more practically in the following examples. It should not be construed, however, that these examples restrict this invention as they are given merely by way of illustration:

Example 1

To 15 ml. of acetonitrile were added 2.75 ml. of phosphorus oxychloride and 8.3 g. of pyridine-hydrogen chloride salt and to the resulting mixture which was maintained at 0°–2° C. was added 4.2 g. of guanosine. The reaction mixture which was in the state of a suspension at first turned completely to a clear solution as the reaction proceeded. After the reaction was carried out for about 4 hours, the reaction mixture was mixed with 150 ml. of ice-water to give an aqueous solution. An analysis of the resulting aqueous solution revealed that the conversion to guanosine phosphates and that to 5'-guanylic acid were 97.6% and 92%, respectively.

After the aqueous solution was maintained at about 5° C. for 2 hours, the same was passed through a column filled with 150 ml. of granulated active carbon to adsorb guanylic acid and the column was washed with about 600 ml. of water, then, eluted with 0.1 N aqueous solution of sodium hydroxide. The eluent, after pH of which was adjusted at less than 8.0, was passed through a column filled with anion exchange resin (Cl-form) to adsorb guanylic acid. Then, the column was first washed with water and, subsequently, eluted with 0.03 N aqueous solution of hydrogen chloride. To the eluent thus obtained was added an amount of sodium hydroxide to adjust the pH at 7.6 and the eluent was concentrated under a reduced pressure to give a syrup. To the concentrated residue was added an amount of methanol and the resulting mixture was gradually cooled to precipitate beautiful needle-like crystals.

The crystals were filtered off and dried under a reduced pressure to obtain 5.1 g. of pure disodium 5'-guanylate.

Example 2

Example 1 was repeated except that pyrophosphoryl chloride was substituted for phosphorus oxychloride. The conversion to guanosine phosphate and that to 5'-guanylic acid were 98.0% and 93.1%, respectively.

Example 3

To 15 ml. of dichloromethane were added 3 ml. of phosphorus oxychloride and 7.3 g. of α-picoline-hydrogen bromide salt and to the resulting mixture which was cooled to a temperature of 4–6° C., was added 4.2 g. of guanosine with stirring.

After the reaction was carried out for about 5 hours, the reaction mixture was poured into 60 ml. of ice-water and allowed to stand at 0°–5° C. for about 2 hours. The resulting aqueous solution was adjusted at a pH of 3 with an addition of sodium hydroxide, and 120 ml. of methanol was added thereto, and then the solution was allowed to stand overnight at a temperature of about 5° C. The precipitate produced was filtered and dissolved in 50 ml. of warm water and after an amount of methanol was added thereto in the same manner as above, the resulting mixture was allowed to stand. The precipitate formed was dissolved in 200 ml. of water and, after pH of the resulting solution was adjusted at 7.0–8.0, the solution was passed through a column filled with 50 ml. of Amberlite IRA-910 (Cl-form), tradename. The column was thereafter first washed with water and eluted with a diluted aqueous solution of hydrogen chloride. By following the same procedures as in Example 1 thereafter, 4.7 g. of disodium 5'-guanylate was obtained.

Example 4

Example 1 was repeated according to the same procedures as described therein except that nitromethane was substituted for acetonitrile. There was obtained 5.05 g. of disodium 5'-guanylate.

Example 5

Example 1 was repeated according to the same procedures as described therein except that dioxane was used in place of acetonitrile. There was obtained 4.7 g. of disodium 5'-guanylate.

Example 6

Example 1 was repeated according to the same procedures as described therein except that a mixed solvent consisting of 10 ml. of acetonitrile and 5 ml. of propionitrile was used in place of acetonitrile. There was obtained 4.8 g. of disodium 5'-guanylate.

Example 7

To 15 ml. of acetonitrile containing 2.7 g. of hydrogen chloride were added 2.5 ml. of phosphorus oxychloride and 5.2 ml. of pyridine and to the resulting mixture was added 4 g. of inosine with agitation at 0°–5° C. After the reaction was carried out for about 2 hours, the reaction mixture was mixed with 150 ml. of ice-water.

A paper electrophoresis analysis of the resulting aqueous solution revealed that the conversion to inosine phosphate and that to 5'-inosinic acid were 99% and 95%, respectively.

By following the same procedures as described in Example 1 thereafter, 5.5 g. of disodium 5'-inosinate was obtained.

Example 8

To 15 ml. of acetonitrile were added 2.7 ml. of phosphorus oxychloride and 7.4 g. of pyridine-hydrogen chloride salt and to the resulting mixture which was maintained at 0°–2° C. was added 4 g. of adenosine with agitation. After the reaction was carried out for about 2.5 hours, the reaction mixture was mixed with 200 ml. of ice-water.

The resulting aqueous solution was treated with active carbon in the same manner as described in Example 1, then, passed through a column filled with Amberlite IRA-900 (Cl-form), tradename. The column was first washed with water and subsequently eluted with 0.05 N aqueous hydrochloric acid solution to elute only adenylic acid.

The eluent was concentrated at a low temperature and to the concentrated residue was added methanol and the resulting mixture was allowed to stand in a refrigerator.

The precipitated beautiful crystal was filtered, then dried to afford 4.5 g. of 5'-adenylic acid.

Example 9

Example 1 was repeated according to the same procedures as described therein except that 3.65 g. of cytidine was used in place of guanosine. 4.8 g. of disodium 5'-cytidylate was obtained.

Example 10

Example 1 was repeated according to the same procedures as described therein except that 3.65 g. of uridine was substituted for guanosine. There was obtained 4.6 g. of sodium 5'-uridylate.

Example 11

Example 6 was repeated according to the same procedures as described therein except that 5.5 g. of hydrogen bromide was used in place of hydrogen chloride. There was obtained 5.3 g. of disodium 5'-inosinate.

Example 12

Example 1 was repeated according to the same procedures as described therein except that 10 g. of triethylamine-hydrogen chloride salt was used in place of pyridine-hydrogen chloride. There was obtained 4.9 g. of disodium 5'-guanylate.

Example 13

Example 1 was repeated according to the same procedures as described therein except that 11 g. of morpholine-sulfuric acid salt was substituted for pyridine-hydrogen chloride.

There was obtained 4.7 g. of sodium 5'-guanylate.

Example 14

Example 1 was repeated according to the same procedures as described therein except that xanthosine was used in place of guanosine.

There was obtained 4.7 g. of disodium 5'-xanthylate.

Example 15

Example 10 was repeated according to the same procedures as described therein except that 13 g. of phosphorus oxybromide was used in place of phosphorus oxychloride. There was obtained 4.8 g. of sodium 5'-inosinate.

We claim:

1. A process for producing 5'-nucleotides by a selective phosphorylation of a primary hydroxyl group of a nucleoside which comprises reacting an unprotected nucleoside with at least one member selected from the group consisting of a phosphorus oxyhalide and pyrophosphoryl chloride in a polar organic solvent containing an organic amine-inorganic acid salt and contacting the resulting reaction mixture with water.

2. A process according to claim 1 wherein said phosphorus oxyhalide is a member selected from the group consisting of phosphorus oxychloride and phosphorus oxybromide.

3. A process according to claim 1 wherein said organic amine-inorganic acid salt is a salt of an organic amine selected from the group consisting of a primary, a secondary and a tertiary amine, and a mineral acid selected from the group consisting of hydrogen chloride, nitric acid, sulfuric acid and chloric acid.

4. A process according to claim 1 wherein said polar organic solvent is selected from the group consisting of a nitrile, a nitro alkane, a cyclic ether, a halogenated alkane, a sulfoxide, a formamide and a ketone.

5. A process according to claim 1 wherein at least about 0.5 mol of said salt is used per mol of said phosphorus oxyhalide or pyrophosphoryl chloride.

References Cited

UNITED STATES PATENTS

| | | | |
|---|---|---|---|
| 3,201,389 | 8/1965 | Fujimoto et al. | 260—211.5 |
| 3,282,920 | 11/1966 | Ouchi et al. | 260—211.5 |
| 3,382,232 | 5/1968 | Honjo et al. | 260—211.5 |
| 3,407,190 | 10/1968 | Honjo et al. | 260—211.5 |

LEWIS GOTTS, Primary Examiner

JOHNNIE R. BROWN, Assistant Examiner